Sept. 11, 1951     W. P. BANCROFT     2,567,464
FOLDING CARRIAGE
Filed Dec. 18, 1948
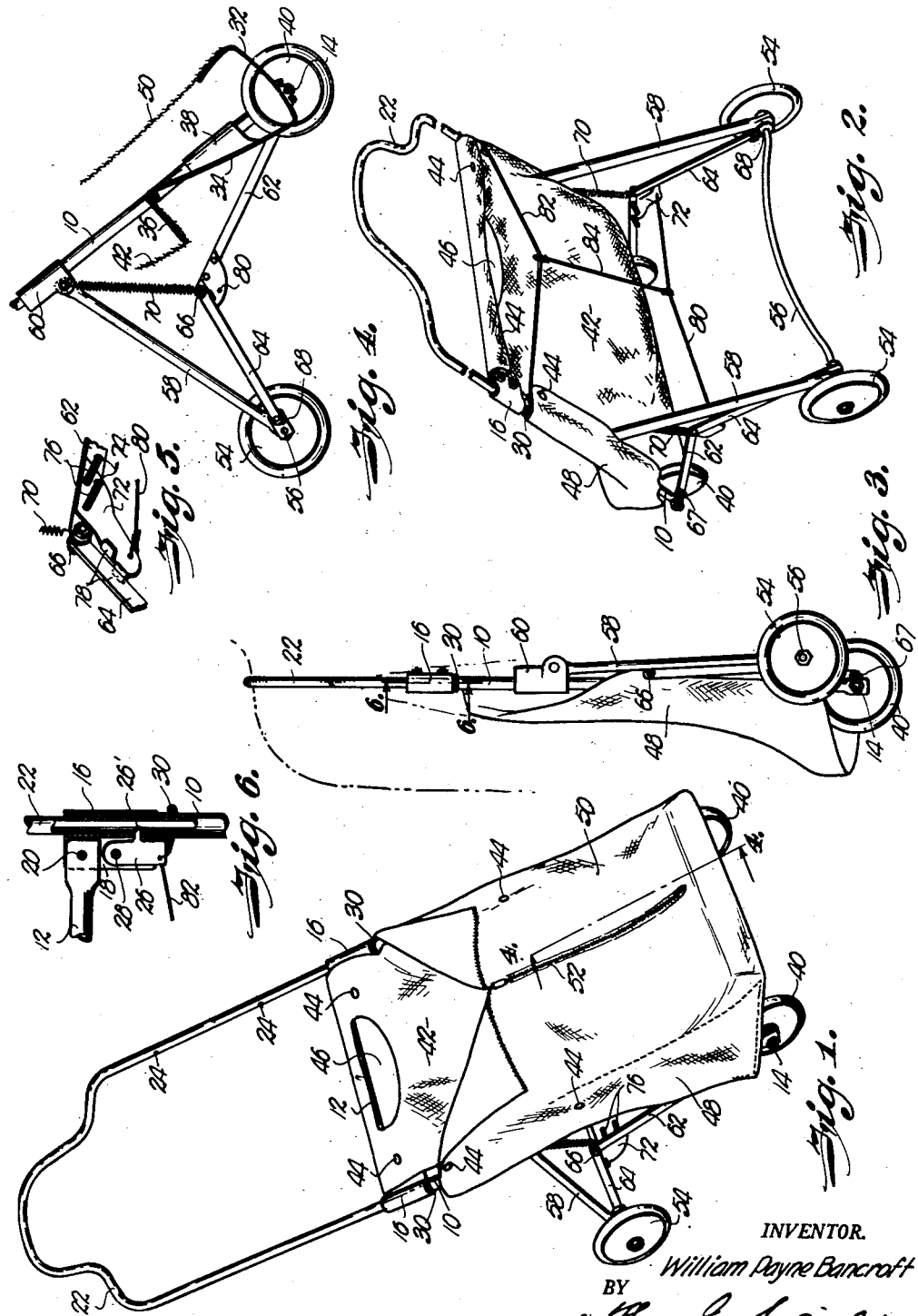
INVENTOR.
William Payne Bancroft
BY
Thos. E. Tedfield
ATTORNEY.

Patented Sept. 11, 1951

2,567,464

UNITED STATES PATENT OFFICE 2,567,464

FOLDING CARRIAGE

William Payne Bancroft, Omaha, Nebr.

Application December 18, 1948, Serial No. 66,057

10 Claims. (Cl. 280—41)

The present invention relates in general to baby carriages or strollers for small children, and the main object is to provide a high quality device of this character which is comfortable for the child, which is exceedingly convenient and simple to use from the operator's standpoint and which may be manufactured easily and economically.

Another aim is to provide a carriage that may be conveniently folded or collapsed into a very compact package for storage, the carriage being light in weight and so designed that it may be folded with child in carriage, to facilitate carrying the child from place to place. To this end an important object resides in the provision of an unique handle, forming a shoulder sling by means of which the device is carried when folded, either empty or with the child in place; another object is to provide a foldable carriage construction which is very easy to manipulate and simple in form, both from a manufacturing and operational standpoint.

A further object is to provide a carriage having a handle that is adjustable according to the height of the operator.

Still another object is to provide a carriage with an integral cover for the occupant, which cover is adjustable to enclose more or less of the occupant as desired and may be removed for purposes of cleaning, or when it is not needed.

Other and further objects, together with the novel features of construction whereby the objects are achieved, will appear in the course of the following description of the invention.

In the accompanying drawings which form a part of the specification and are to be read in conjunction therewith, and in which like reference numerals are employed to indicate like parts of the various views.

Fig. 1 is a front perspective view of a baby carriage or stroller embodying the invention, Fig. 2 is a rear perspective view of the carriage, Fig. 3 is a side elevational view showing the carriage in collapsed or folded condition, Fig. 4 is a fragmentary cross-sectional view taken along the vertical plane 4—4 of Fig. 1 in the direction of the arrows, Fig. 5 is a perspective view showing details of the latching device, and Fig. 6 is a cross-sectional view taken along the line 6—6 of Fig. 3.

The main frame of my carriage comprises a pair of laterally spaced tubular members 10 interconnected at their upper ends by a cross bar 12 and connected at their lower ends by an axle 14. As best seen in Fig. 6, the opposite extremities of the cross bar are flattened and secured to the side members by means of split clamping sleeves or brackets 16. Each bracket encircles one of the side members and has a pair of inwardly extending ears 18 between which the end of the cross bar 12 is sandwiched; a bolt 20, passing through aligned holes in the ears and cross bar, clamps the bracket tightly to the associated tubular member and fastens the cross bar rigidly thereto.

The handle 22 of my carriage is of modified U-shape, inverted so that its parallel legs extend downwardly into the tubular side members 10 in telescoping relation thereto. It is provided with a series of spaced holes 24 on the inside of each leg, these cooperating with latching elements 26 to lock the handle in any desired position relative to the tubular frame members. Supported on pivot pin 28, each latching element is disposed between the ears 18 of one bracket 16 and urged by a garter spring 30 toward the handle so that an integral finger 26' projects into one of the holes 24 and consequently prevents the handle from sliding axially in the tube. By pivoting the latching elements away from the handle against the tension of their associated springs, as will be described hereinafter, the fingers 26' are withdrawn from the holes so the handle can be pushed in or pulled out of the tubes, as desired, to a new position where it will again be locked by the latching elements in holes 24 when the latching elements are released.

Referring to Fig. 4, the tubular frame members carry a formed sheet metal body comprising a foot rest 32 secured to the front axle, a leg rest 34 extending upwardly therefrom and a seat 36 projecting rearwardly from the upper edge of the leg rest; this body spans nearly the full width of the carriage and the leg rest portion is provided along its lateral edges with integral ears 38 which are bent up and around the side frame members 10 for support. The foot rest and the lower part of the leg rest are cut away slightly at the sides to receive the front wheels 40 which are disposed on the axle 14 inside of the frame member 10.

From the seat, a flexible back rest 42 of fabric or like material extends upwardly to the cross bar 12, preferably being secured at both its upper and lower ends by means of snap fasteners 44 to permit easy removal for cleaning. An opening 46 is provided at the top of the back rest to facilitate grasping the cross bar 12 for the purpose of lifting the carriage.

Over the body and main frame there is a flexible cover that may be made of the same material as the back rest 42; preferably held in place by similar snap fasteners 44, this cover comprises side panels 48 and a front panel 50 provided with a slide fastener 52 or other form of closure device whereby access may be had to the interior of the carriage. If desired, the cover may be lined with lambs wool or any other suitable material affording warmth to the child who occupies the seat of the carriage.

The rear wheels 54 and axle 56 are carried by laterally spaced arms 58, these being hingedly connected at their upper ends to brackets 60 which are fixedly secured to the main frame members 10 (see Figs. 3 and 4). Connecting the front and rear axles are a pair of toggle links each comprising bars 62 and 64 hingedly joined at 66. The forward bars are connected to spacer links 67 on the front axle and the rear bars are connected to similar spacer links 68 on the rear axle.

Urging the two toggles toward folded condition there are a pair of coiled tension springs 70, each fastened at one end to one toggle at the hinge pin 66 with its other end fastened to the bracket 60. A latch 72 on each toggle normally prevents the associated spring from completely folding the toggle. This latch comprises a plate perforated to slip rather loosely over pins 74 on the forward bars 62; the pins have enlarged heads and, behind the heads, they are encircled by coiled compression springs 76 which bear against the plate 72, tending to maintain same flat against the side of the bar 62. The latch plate projects rearwardly and, under the rear toggle bar 64, has laterally projecting lugs 78 limiting the movement of the toggle links toward folded position.

Accordingly, when the carriage is unoccupied the position of the toggle and the associated parts is as shown in Figs. 1, 2, 4 and 5. Since the arms 58 are hinged to the main frame members 10, it will be apparent that the rear axle can move away from the front axle, and this is the action which takes place when a child is placed in the seat of the carriage inasmuch as its weight urges the main frame members 10 to pivot downwardly about the front axle, forcing the lower ends of arms 58 to spread away from the lower ends of the forward frame member.

The extent of such spreading is, of course, limited by the toggle links since when the toggles are full open (i. e., with bars 62 and 64 in a straight line) the rear axle is as far from the front axle as possible. In practice, the weight of a child in the carriage will not open the toggles to their full extent but only to the point where the child's weight is balanced by springs 70 which, it will be seen, are stretched as the toggles open. In other words, under the weight of a child each toggle assumes only a slightly more obtuse angle than shown in Figs. 1, 2, 4 and 5, the child then being resiliently supported by the springs 70.

This resilient form of support is surprisingly effective in giving the child a comfortably cushioned ride as the carriage is propelled along the ground. A rocking motion can be imparted to the carriage either while it is travelling or at rest simply by periodically urging the handle 22 downwardly; this opens the toggle further, stretching springs 70 which then will restore the parts when the downward pressure on the handle is released, so that the child's body is oscillated gently up and down with successive applications of pressure to the handle. In the same way the effect of ground irregularities which are encountered by the carriage wheels is absorbed by the springs 70, causing the child simply to rock gently in cushioned fashion.

The slide fastener 52 in the cover 50 makes it possible to cover the child easily to whatever extent is desired. Conveniently, the fastener is opened down its full length preparatory to placing a child in the carriage and then is closed upwardly, for example to cover only the lower half of the body or, if the weather is severe, all of the body leaving only the head exposed. In very mild or warm weather the cover may be removed entirely from the carriage by detaching same at the snap fasteners 44.

The manner in which the carriage is folded now will be described. Attention is directed to the fact that the two latching plates 72 are connected together by a flexible cord or cable 80 while the handle-latching elements 26 are similarly interconnected by a flexible cable 82 which is within easy reach of the operator. The midpoint of the two cables are tied together by a third cable 84. By grasping the midpoint of cable 82, cable 84 can be drawn upwardly and this causes cable 80 to draw the latch plates 72 inwardly against the tension of springs 76, as may best be appreciated from Figs. 2 and 5.

Then lugs 78 are drawn clear of bars 74, springs 70 pull the toggle links up to folded position causing the arms 58 to swing forward as shown in Fig. 3. It will be seen that the rear wheels 54 are positioned outside of the arms 58 and that the front wheels 40 are positioned inside of the frame members 10, whereby the rear wheels overlap and straddle the front wheels when the carriage is folded.

The cable 82 also makes it possible for the operator to withdraw latches 26 simultaneously from the holes in opposite sides of the handle 22 so that the handle may be telescoped into the tubular frame members 10 as described hereinbefore. With the carriage folded and the handle telescoped it makes an exceedingly compact package. In this condition the carriage may conveniently be carried from place to place by slinging the handle over the shoulder as shown in Fig. 3; the narrow arched central portion of the handle fits the shoulder snugly, preventing it from slipping therefrom.

If desired, the child may be left in the carriage when it is thus folded and supported on the shoulder, it being understood that the slide fastener 52 in this case is drawn upwardly so the cover 50 forms a pocket which holds the child from falling. Since the weight of the child and carriage is borne on the shoulder, they are much more easily carried in this fashion than in the arms, and the arrangement greatly facilitates getting them on and off of streetcars, trains, buses, airplanes and the like.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as many possible embodiments of the invention may be made without departing from the scope thereof, it is to be understood that all matter herein set forth or shown in the accompanying drawings is to be interpreted as illustrative and not in a limiting sense.

Having described the invention, I claim:

1. In a stroller or the like, an inverted U-shaped main frame inclined forwardly downward and having at its lower end a wheel supporting axle, a seat between the sides of the frame and supported on said sides at a point spaced upwardly from the axle, legs hinged to the sides of the frame at a point above said seat, said legs extending rearwardly downward from the hinge and carrying wheels at their lower ends, a toggle link comprising a pair of bars hinged together with one end of the toggle connected to the lower part of a rear leg and the other end of the toggle connected to the lower part of the main frame, and spring means always urging the toggle hinge upwardly.

2. In a carriage, forward and rear wheels mounted respectively on forward and rear frames, said frames hinged together at a point above and intermediate the forward and rear wheels, a load supporting body carried by one of the frames whereby a load in said body tends to depress the hinge between the frames and increase the distance between the forward and rear wheels, a toggle limiting the distance said wheels can move apart, said toggle comprising a pair of bars hinged together with one end of the toggle connected to the forward frame and the other end of the toggle connected to the rear frame, and spring means connected to the toggle urging same toward folded position thereby to balance the load in said body.

3. In a carriage, forward and rear wheels mounted respectively on forward and rear frames, said frames hinged together at a point above and intermediate the forward and rear wheels whereby the distance between the forward and rear wheels is variable, a toggle comprising a pair of bars hinged together with one end of the toggle connected to the forward frame and the other end of the toggle connected to the rear frame, and spring means urging the toggle to folded position whereby said toggle tends to draw the forward wheels toward the rear wheels.

4. In a carriage, forward and rear wheels mounted respectively on forward and rear frames, said frames hinged together at a point above and intermediate the forward and rear wheels whereby the distance between the forward and rear wheels is variable, a toggle comprising a pair of bars hinged together with one end of the toggle connected to the forward frame and the other end of the toggle connected to the rear frame, and a coiled tension spring having one end connected to the hinge between said frames and the other end connected to the hinge between said bars, tending to fold the toggle and draw the forward wheels toward the rear wheels.

5. In a carriage, forward and rear wheels mounted respectively on forward and rear frames, said frames hinged together at a point above and intermediate the forward and rear wheels whereby the distance between the forward and rear wheels is variable, a toggle comprising a pair of bars hinged together with one end of the toggle connected to the forward frame and the other end of the toggle connected to the rear frame, spring means urging the toggle to folded position whereby said toggle tends to draw the forward wheels toward the rear wheels, and a stop effective when the toggle is partly folded for preventing further movement thereof toward folded position.

6. In a carriage, forward and rear wheels mounted respectively on forward and rear frames, said frames hinged together at a point above and intermediate the forward and rear wheels whereby the distance between the forward and rear wheels is variable, a toggle comprising a pair of bars hinged together with one end of the toggle connected to the forward frame and the other end of the toggle connected to the rear frame, spring means urging the toggle to folded position whereby said toggle tends to draw the forward wheels toward the rear wheels, a stop normally effective when the toggle is partly folded for preventing further movement thereof toward folded position, and means for withdrawing said stop to permit complete folding of the toggle.

7. In a carriage, forward and rear wheels mounted respectively on forward and rear frames, said frames hinged together at a point above and intermediate the forward and rear wheels whereby the distance between the forward and rear wheels is variable, a pair of laterally spaced toggles each comprising two bars hinged together, one end of each toggle connected to the forward frame and the other end of each toggle connected to the rear frame, spring means urging the toggles toward folded position, a stop for each toggle, the stops located on corresponding bars of the respective toggles and each stop normally being in the path of the other bar of the toggle, a flexible strand connecting the two stops, and means for applying a force to said strand for moving the stops toward one another thereby to withdraw the stops and permit folding of the toggles.

8. A stroller as in claim 2 wherein said forward frame includes a pair of laterally spaced tubular side rails, an inverted U-shaped handle having its legs telescopingly received in said tubular side rails for vertical adjustment of the handle relative to said forward frame, means for releasably securing said handle to said frame in adjusted position, and the bight of the handle having a shoulder-receiving arched portion whose sides are substantially parallel to the opposite legs of the handle but spaced inwardly therefrom.

9. A stroller as in claim 2 wherein said forward frame includes a pair of laterally spaced tubular side rails, an inverted U-shaped handle having its legs telescopingly received in said tubular side rails for vertical adjustment of the handle relative to said forward frame, means for latching said handle in adjusted position, said means comprising a pair of latches on the respective side rails, notches spaced at intervals along both legs of the handle for receiving said latches, springs urging said latches toward the notches, and a flexible strand connecting the two latches for moving them simultaneously toward one another and out of the notches.

10. A stroller as in claim 7 wherein said forward frame includes a pair of laterally spaced tubular side rails, an inverted U-shaped handle having its legs telescopingly received in said tubular side rails for vertical adjustment of the handle relative to said forward frame, means for latching said handle in adjusted position, said means comprising a pair of latches on the respective side rails, notches spaced at intervals along both legs of the handle for receiving said latches, springs urging the latches toward the notches, a flexible strand connecting the two latches for moving them simultaneously toward one another and out of the notches, said strand being located above the flexible strand connecting said stops for the two toggles, and said means for applying a force to the latter strand to withdraw the stops comprising a link connecting the mid-point of one of the strands to the mid-point of the other.

WILLIAM PAYNE BANCROFT.

REFERENCES CITED

The following references are of record in the file of this patent:

UNITED STATES PATENTS

| Number | Name | Date |
|---|---|---|
| 152,298 | Martienssen | June 23, 1874 |
| 486,678 | Muehleisen | Nov. 22, 1892 |
| 1,482,146 | Pomilio | Jan. 29, 1924 |
| 1,695,409 | Banks | Dec. 18, 1928 |
| 2,264,121 | Pattiani | Nov. 25, 1941 |
| 2,395,208 | Wylie | Feb. 19, 1946 |

FOREIGN PATENTS

| Number | Country | Date |
|---|---|---|
| 218,494 | Great Britain | July 10, 1924 |